US012734917B2

(12) United States Patent
Okazaki et al.

(10) Patent No.: US 12,734,917 B2
(45) Date of Patent: Sep. 15, 2026

(54) ELECTRIC WORK VEHICLE AND CHARGING METHOD

(71) Applicant: KUBOTA CORPORATION, Osaka (JP)

(72) Inventors: Kazuto Okazaki, Osaka (JP); Shunya Takase, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 743 days.

(21) Appl. No.: 18/137,039

(22) Filed: Apr. 20, 2023

(65) Prior Publication Data

US 2024/0067011 A1 Feb. 29, 2024

(30) Foreign Application Priority Data

Aug. 30, 2022 (JP) ................................ 2022-136872

(51) Int. Cl.
*B60L 58/12* (2019.01)
*B60L 53/24* (2019.01)

(52) U.S. Cl.
CPC ............... *B60L 53/24* (2019.02); *B60L 58/12* (2019.02); *B60L 2200/40* (2013.01)

(58) Field of Classification Search
CPC ................................ B60L 58/12; B60L 53/24
See application file for complete search history.

(56) References Cited

U.S. PATENT DOCUMENTS 8,818,588 B2 8/2014 Ambrosio
2014/0097676 A1* 4/2014 Kusumi .................... B60L 7/14 307/10.1
2015/0046003 A1 2/2015 Doi
2016/0340869 A1 11/2016 Takeo
2016/0340870 A1 11/2016 Takeo
2021/0252987 A1* 8/2021 Brenninger .............. B60K 1/00

FOREIGN PATENT DOCUMENTS

JP 2013-110893 A 6/2013
JP 2015-035841 A 2/2015
JP 2020-040537 A 3/2020
JP 2021-170925 A 10/2021

OTHER PUBLICATIONS

Office Action, dated Aug. 26, 2025, in Japanese family member application No. 2022-136872 with English language translation thereof.
European Search Report dated Jan. 25, 2024 in European family member application No. 23169636.0.

* cited by examiner

*Primary Examiner* — Robert Grant
(74) *Attorney, Agent, or Firm* — GREENBLUM & BERNSTEIN, P.L.C.

(57) ABSTRACT

An electric work vehicle comprises: a battery configured to store electric power; a motor generator conductively connected to the battery; a power transfer device having a power output shaft configured to transfer motive power from the motor generator; and a controller configured to switch between a first mode and a second mode.

7 Claims, 4 Drawing Sheets

5
30
38
22
11
5A
31
16
3
32
15
21
19
M
20
Q
4
B
U
D
F
12
10
2

B
U
D
F
22
5A
18
16
17
11
15a
15
15b
M
19
4
14
10

HT
VT
TEMPERATURE OF GENERATED HEAT
OUTPUT VOLTAGE OF BATTERY
REGENERATIVE TORQUE (REGENERATIVE CURRENT)
ROTATIONAL SPEED
T1
T2
T3
TIME

ELECTRIC WORK VEHICLE AND CHARGING METHOD

CROSS REFERENCE TO RELATED APPLICATIONS

This application claims the benefit of priority to Japanese Patent Application No. 2022-136872 filed on Aug. 30, 2022. The entire contents of this application are hereby incorporated herein by reference.

BACKGROUND OF THE INVENTION

Field of the Invention

The present invention relates to an electric work vehicle and a charging method for charging a battery mounted in an electric work vehicle.

Description of the Related Art

For example, an electric work vehicle disclosed in JP 2013-110893A includes a battery that stores electric power and a motor driven with the electric power stored in the battery. The battery needs to be charged if the electric power stored in the battery runs out, and moving the battery to a charging location may be a burden if the working area is distant from the charging facility, for example. Preparing a portable charger is also conceivable in order to be able to charge the battery in the working area, but portable chargers are often expensive. The present invention provides an electric work vehicle and a charging method that enable charging at any location with an inexpensive configuration.

SUMMARY OF THE INVENTION

An electric work vehicle according to the present invention comprises:

a battery configured to store electric power;

a motor generator conductively connected to the battery;

a power transfer device having a power output shaft configured to transfer motive power from the motor generator; and a controller configured to switch between (i) a first mode, in which the controller drives the motor generator with use of the electric power stored in the battery, and (ii) a second mode, in which the controller causes the motor generator to generate regenerative power while the motor generator rotates due to receiving motive power from a drive source connected to the power output shaft, and charge the battery with the regenerative power.

According to the present invention, the drive source is connected to the power output shaft, and the battery can be charged as a result of the drive source rotating the motor generator via the power output shaft to cause the motor generator to generate regenerative power. That is, the battery can be charged by causing the motor generator, which is usually driven to perform work, to generate power. This realizes a configuration that is more inexpensive than a configuration in which a dedicated portable charger is prepared. The drive source may have any configuration as long as the drive source is connectable to the power output shaft. For example, a drive source that can be easily prepared in a working area can be used. This enables the battery to be charged at any location, unlike a configuration in which a battery is charged at a charging facility. The present invention thus realizes an electric work vehicle that can be charged at any location with an inexpensive configuration.

The present invention may also be a charging method for charging a battery mounted in an electric work vehicle. The charging method in this case comprises:

connecting a drive source to a power output shaft of a power transfer device configured to transfer motive power from a motor generator conductively connected to the battery;

rotating, with use of the drive source, the motor generator via the power transfer device, and causing the motor generator to generate regenerative power; and charging the battery with the regenerative power.

In one preferred embodiment of the electric work vehicle of the present invention, the controller makes regenerative torque of the motor generator larger as time passes from a point in time at which the second mode starts until a point in time at which a preset time passes.

The larger the regenerative torque is, the larger the load applied to the drive source is. Therefore, if the regenerative torque sharply increases, a sudden load is applied to the drive source, and there is a concern that the driving speed of the drive source will sharply decrease, or that the drive source will stall. This configuration enables the regenerative torque of the motor generator to be gradually increased. This alleviates the concern that the driving speed of the drive source will sharply decrease, or that the drive source will stall.

In one preferred embodiment of the electric work vehicle of the present invention, the controller sets the regenerative torque to zero at a timing of starting the second mode.

With this configuration, the motor generator initially rotates with no load in response to the control mode of the controller switching to the second mode. The concern that a sudden load will be applied to the drive source can thus be avoided.

In one preferred embodiment of the electric work vehicle of the present invention, the electric work vehicle further comprises:

a voltage detector configured to detect an output voltage of the battery, wherein in the second mode, in response to the output voltage of the battery exceeding a preset first threshold, the controller controls the motor generator in such a manner that the regenerative power is smaller than the regenerative power exhibited at a point in time at which the output voltage of the battery reached the first threshold.

This configuration prevents overcharging of the battery.

In one preferred embodiment of the electric work vehicle of the present invention, the electric work vehicle further comprises:

a temperature detector configured to detect a temperature of heat generated by the battery, wherein in the second mode, in response to the temperature of heat generated exceeding a preset second threshold, the controller controls the motor generator in such a manner that the regenerative power is smaller than the regenerative power exhibited at a point in time at which the temperature of heat generated reached the second threshold.

This configuration restrains an increase in the temperature of heat generated by the battery.

In one preferred embodiment of the electric work vehicle of the present invention, the power output shaft is a PTO shaft connectable to an input shaft of a work device.

The power output shaft of this configuration is a PTO shaft. This allows the PTO shaft to be also used as a shaft for inputting motive power from the drive source and rotating the motor generator. This enables an inexpensive configuration that enables the battery to be charged at any location.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Modes for carrying out the present invention will be described with reference to the drawings. An "F" arrow", a "B" arrow, an "L" arrow, and an "R" arrow in the diagrams respectively indicate forward, backward, leftward, and rightward directions in the following description, unless otherwise stated. A "U" arrow and a "D" arrow in the diagrams indicate upward and downward directions, respectively.

Overall Configuration of Electric Work Vehicle

Figure 1:
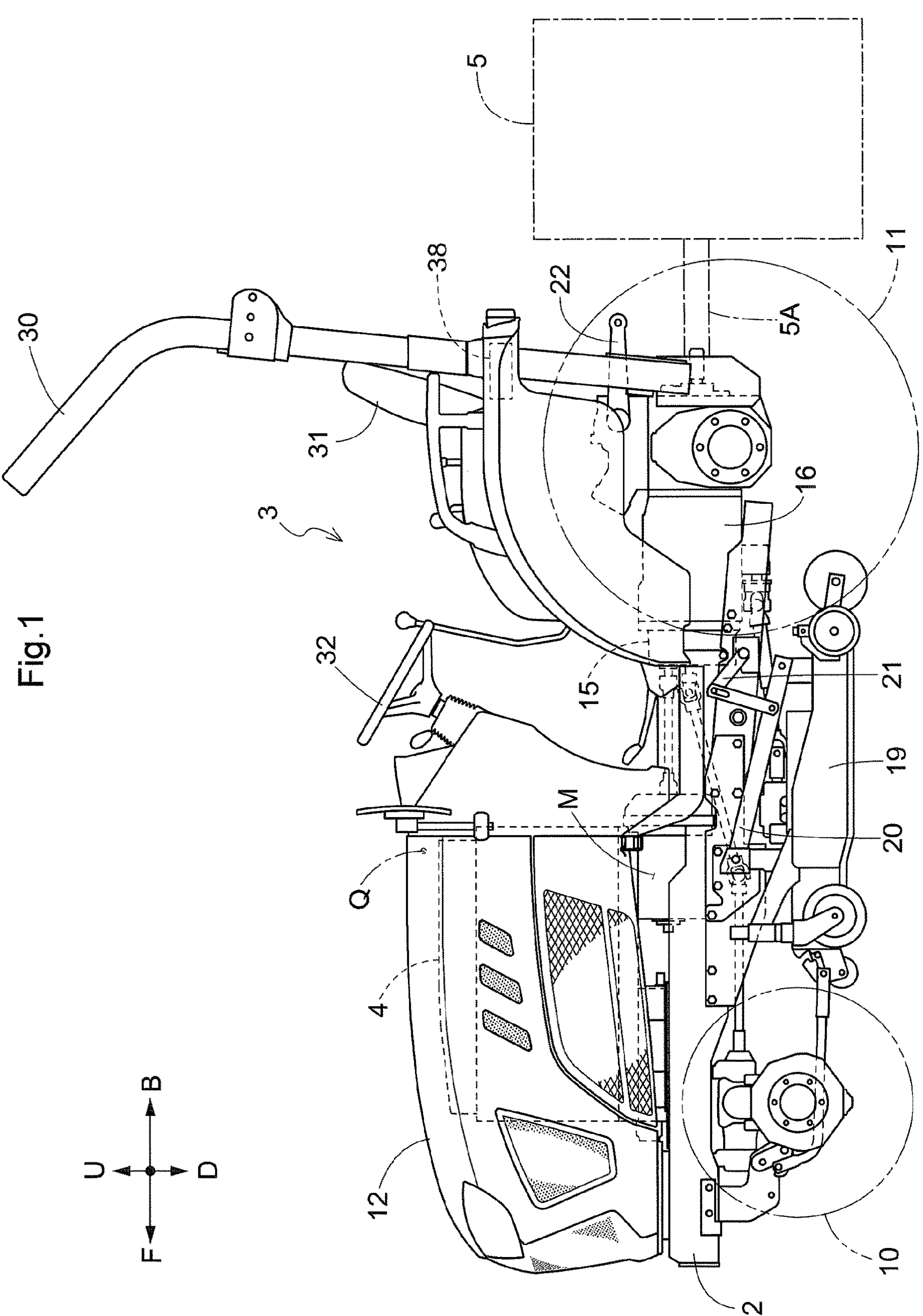
FIG. 1 is a left side view of an electric tractor.

An electric work vehicle of an embodiment will be described below. FIG. 1 shows an electric tractor as an example of the electric work vehicle. The electric tractor includes left and right front wheels 10, left and right rear wheels 11, and a cover member 12, as shown in FIG. 1.

The electric tractor also includes a body frame 2 and an operator section 3. The left and right front wheels 10 and the left and right rear wheels 11 support the body frame 2.

The cover member 12 is in a front part of the body. The operator section 3 is rearward of the cover member 12. In other words, the cover member 12 is forward of the operator section 3.

The operator section 3 has a protective frame 30, a seat 31, and a steering wheel 32. An operator can sit on the seat 31. The operator can thus board the operator section 3. The left and right front wheels 10 are steered by operating the steering wheel 32. The operator can perform various operations in the operator section 3.

The electric tractor includes a battery 4. The cover member 12 is able to pivot about an opening-closing axis Q, which is parallel to the left-right direction of the body. The cover member 12 is thus openable and closable. The cover member 12 covers the battery 4 while the cover member 12 is closed.

Figure 2:
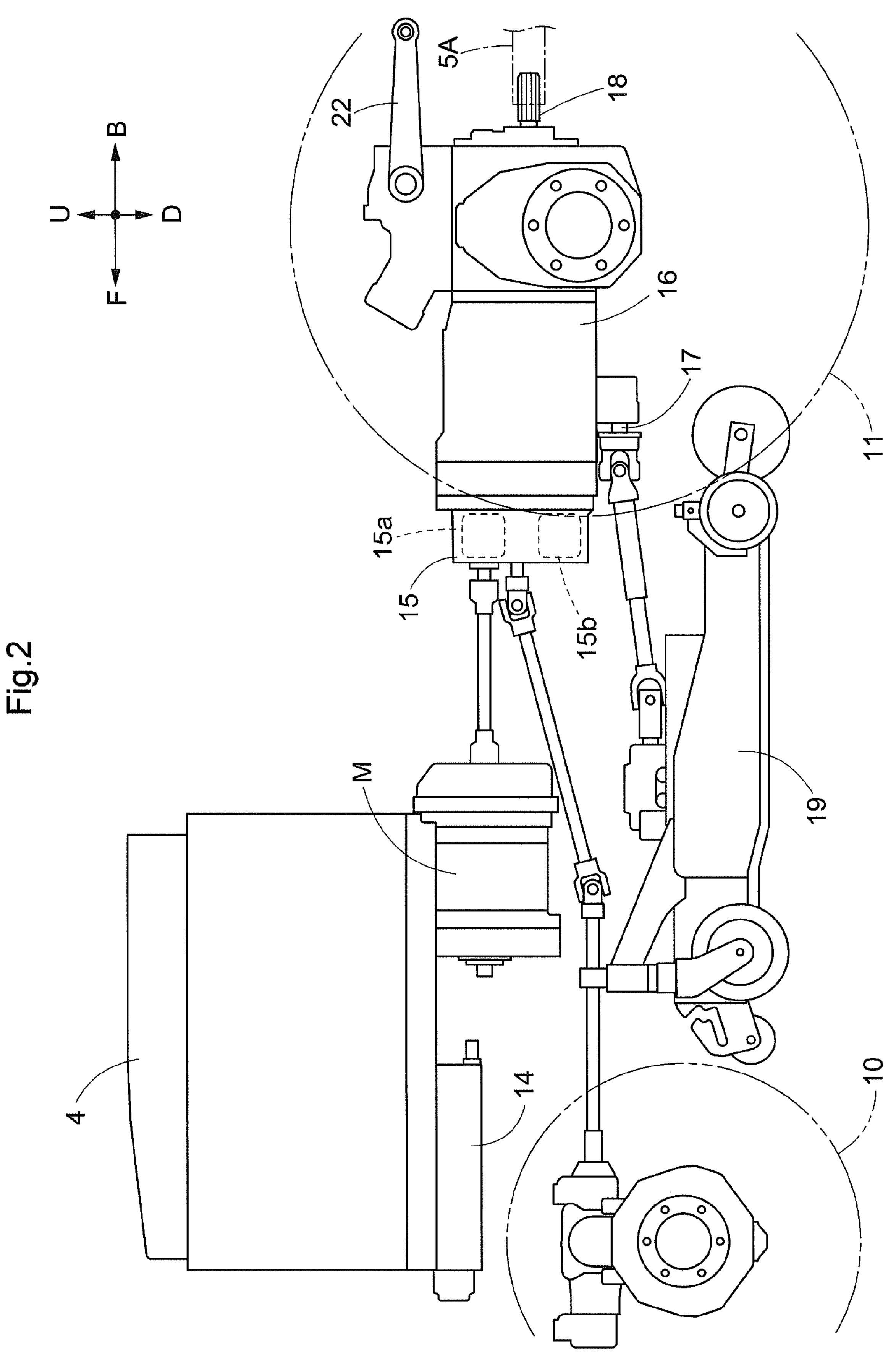
FIG. 2 is a left side view showing the placement of an inverter and other members.

The electric tractor includes a converter 14 and a motor generator M, as shown in FIG. 2. The battery 4 supplies electric power to the converter 14. The converter 14 converts direct-current electric power from the battery 4 to alternating-current electric power and supplies the alternating-current electric power to the motor generator M. The alternating-current electric power supplied from the converter 14 drives the motor generator M. In other words, the motor generator M is driven by consuming electric power stored in the battery 4.

Although the details will be described later, the motor generator M of this embodiment generates electric power while rotating due to receiving kinetic energy from outside. The converter 14 converts alternating-current electric power generated by the motor generator M to direct-current electric power and supplies the direct-current electric power to the battery 4 while the motor generator M is used as a generator. The battery 4 is thus charged.

Figure 3:
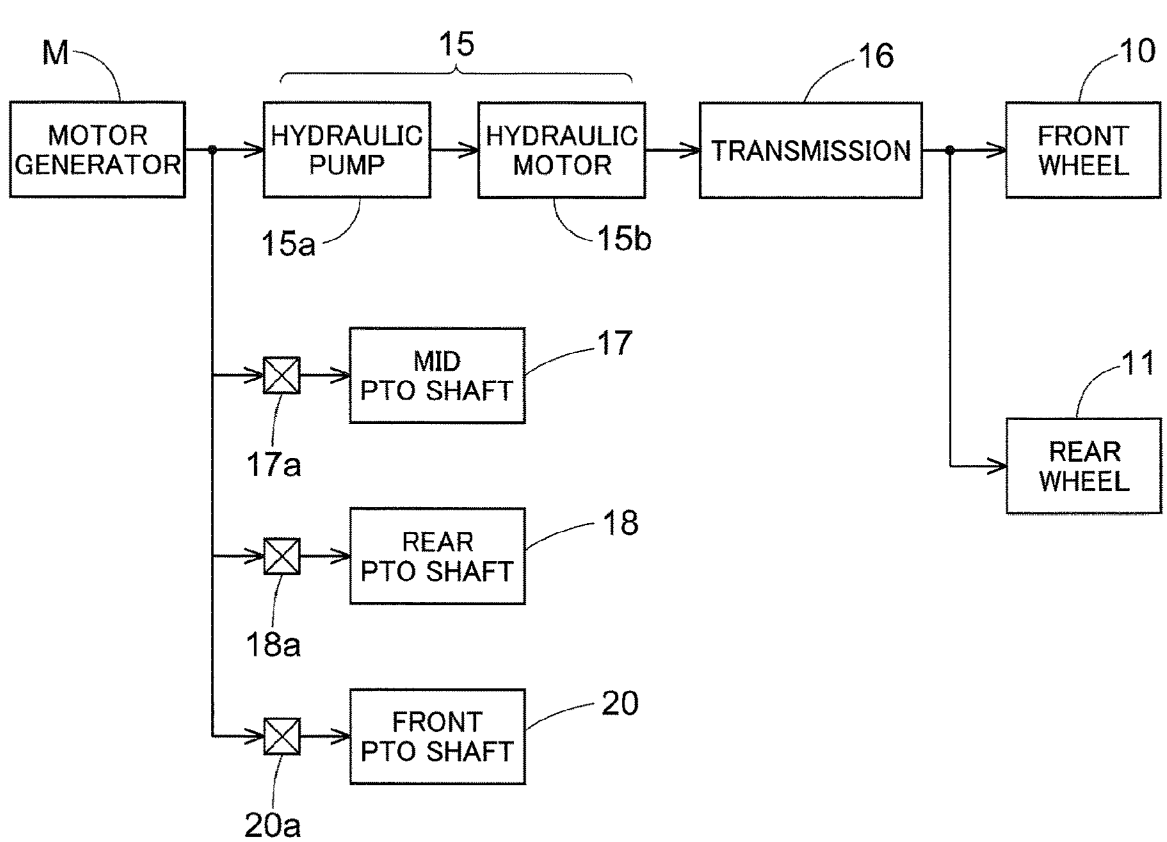
FIG. 3 shows a flow of motive power transfer.

The electric tractor includes a hydrostatic continuously variable transmission 15 and a transmission 16, as shown in FIGS. 2 and 3. The hydrostatic continuously variable transmission 15 has a hydraulic pump **15*a* and a hydraulic motor 15*b*, as shown in FIG. 3**.

Rotational power from the motor generator M drives the hydraulic pump **15*a*. Rotational power is output from the hydraulic motor 15*b* in response to driving of the hydraulic pump 15*a*. Note that the hydrostatic continuously variable transmission 15 is configured in such a manner that the rotational power is subjected to speed change between the hydraulic pump 15*a* and the hydraulic motor 15*b*. Also, the gear ratio of the hydrostatic continuously variable transmission 15** can be changed steplessly.

The rotational power output from the hydraulic motor **15*b* is transferred to the transmission 16. The rotational power transferred to the transmission 16 is subjected to speed change by a gear-type speed change mechanism of the transmission 16, and is distributed to the left and right front wheels 10 and the left and right rear wheels 11. This drives the left and right front wheels 10 and the left and right rear wheels 11**.

The electric tractor also includes a mid PTO shaft 17, a rear PTO shaft 18, and a front PTO shaft 20, as shown in FIGS. 2 and 3. A first clutch **17*a* is interposed between the motor generator M and the mid PTO shaft 17. A second clutch 18*a* is interposed between the motor generator M and the rear PTO shaft 18. A third clutch 20*a* is interposed between the motor generator M and the front PTO shaft 20**.

The first clutch **17*a* and the second clutch 18*a* function as PTO clutches. The first clutch 17*a* and the second clutch 18*a* are switchable between an on-state of transferring motive power and an off-state of not transferring motive power. The rotational power is transferred from the motor generator M to the mid PTO shaft 17 while the first clutch 17*a* is in the on-state. The mid PTO shaft 17 corresponds to a "power output shaft" recited in the claims. Further, the mid PTO shaft 17 and the first clutch 17*a*** correspond to a "power transfer device" recited in the claims, having the power output shaft for transferring motive power from the motor generator M.

The rotational power is transferred from the motor generator M to the rear PTO shaft 18 while the second clutch **18*a* is in the on-state. The rear PTO shaft 18 corresponds to the "power output shaft" recited in the claims. The rear PTO shaft 18 and the second clutch 18*a* correspond to a "power transfer device" recited in the claims, having the power output shaft for transferring motive power from the motor generator M. In addition, the rotational power is transferred from the motor generator M to the front PTO shaft 20 while the third clutch 20*a* is in the on-state. The front PTO shaft 20 corresponds to the "power output shaft" recited in the claims. The front PTO shaft 20 and the third clutch 20*a*** correspond to a "power transfer device" recited in the claims, having the power output shaft for transferring motive power from the motor generator M.

The rotational power output from the motor generator M is thus distributed to the hydraulic pump 15*a*, the mid PTO shaft 17, the rear PTO shaft 18, and the front PTO shaft 20. This rotates the mid PTO shaft 17, the rear PTO shaft 18, and the front PTO shaft 20. That is, the motor generator M drives at least either a traveling device or a work device by consuming electric power stored in the battery 4.

The rotational power of the mid PTO shaft 17, the rear PTO shaft 18, or the front PTO shaft 20 drives the work device if the work device is connected to the mid PTO shaft 17, the rear PTO shaft 18, or the front PTO shaft 20. For example, a mowing device 19 serving as an example of the work device is connected to the mid PTO shaft 17 of this embodiment, as shown in FIG. 2. The rotational power of the mid PTO shaft 17 drives the mowing device 19.

Configuration of Control System

Figure 4:
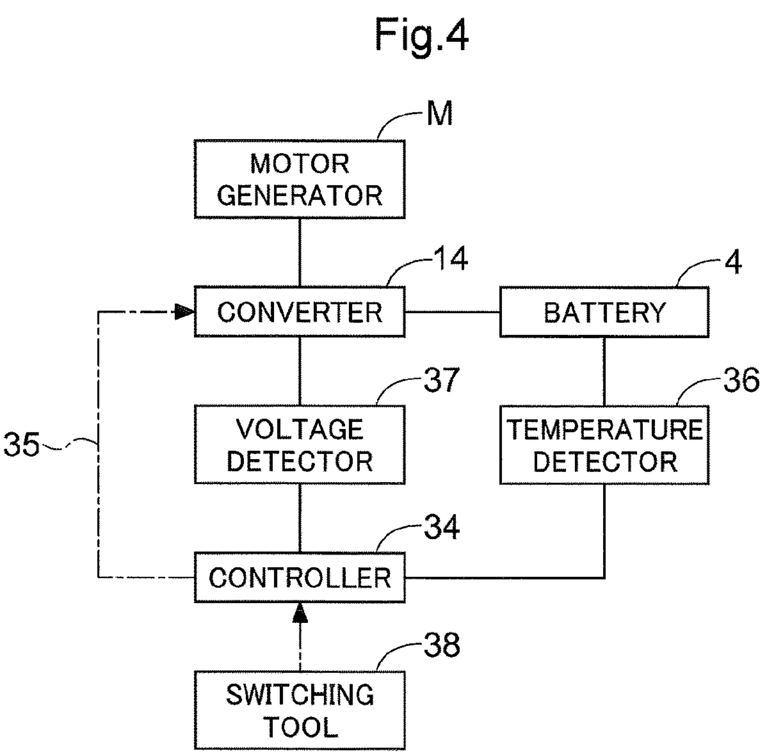
FIG. 4 is a block diagram showing a control configuration of an electric work vehicle.

The motor generator M has a control configuration that includes a controller 34 for controlling driving of the motor generator M, and the converter 14, as shown in FIG. 4. The controller 34 is a core element of a control system of the electric work vehicle, and is configured as a collection of ECUs. The controller 34 is connected to the converter 14 via a signal harness 35 of a CAN (Controller Area Network) type in such a manner that data communication is possible.

The controller 34 outputs a command signal to the converter 14 in accordance with a command from an accelerator device (not shown). The converter 14 controls the output of the motor generator M by adjusting electric power (voltage value, frequency, current value, etc.) supplied from the battery 4 to the motor generator M in accordance with the command signal from the controller 34.

The battery 4 is a lithium ion battery, for example. Although not shown in the figures, the battery 4 has a large number of stacked small low-voltage unit batteries (cells). The output voltage of the battery 4 is 250 volts, for example. The unit batteries (cells) are housed in a housing case. These unit batteries (cells) are sealed by this housing case.

A temperature detector 36 detects the temperature of heat generated by the battery 4. The value detected by the temperature detector 36 is sent to the controller 34. Note that the temperature detector 36 may be a part of the battery 4.

A voltage detector 37 detects the output voltage of the battery 4. The value detected by the voltage detector 37 is sent to the controller 34. Note that the voltage detector 37 may be a part of the converter 14 or a part of the battery 4.

The controller 34 of this embodiment has a plurality of control modes. The plurality of control modes include a first mode and a second mode. The controller 34 in the first mode drives the motor generator M with use of electric power stored in the battery 4. While the control mode of the controller 34 is the second mode, the controller 34 causes the motor generator M to generate regenerative power while the motor generator M rotates due to receiving kinetic energy from outside, and charges the battery 4 with the regenerative power. That is, the controller 34 is switchable between the first mode and the second mode.

A switching tool 38 accepts a manual operation for switching the control mode of the controller 34. The controller 34 is switchable between the first mode and the second mode based on a manual operation performed on the switching tool 38.

The rear PTO shaft 18 is rotatable by motive power from a drive source while an output shaft 5A of the drive source 5 is connected to the rear PTO shaft 18, for example, as shown in FIGS. 1 and 2. The drive source 5 may be, for example, an engine, an electric motor, a hydraulic motor, or any other power takeoff shaft of the vehicle.

Motive power of the drive source 5 rotates the motor generator M and enables the motor generator M to generate power while the output shaft 5A of the drive source 5 is connected to the rear PTO shaft 18 and the first clutch 17*a* is in the on-state. If the control mode of the controller 34 is the second mode at this time, the battery 4 is charged by regenerative power of the motor generator M.

That is, the "power output shaft" recited in the claims is the rear PTO shaft 18 that is connectable to an input shaft of the work device. The rear PTO shaft 18 is also used as a shaft for receiving motive power from the drive source 5 and rotating the motor generator M. This enables an inexpensive configuration that enables charging at any location.

Regenerative Control in Second Mode

A description will be given of a configuration by which the controller 34 controls regenerative power of the motor generator M in the second mode, with reference to the flowchart in FIG. 5. The horizontal axis in FIG. 5 indicates time. The timing at which the controller 34 starts regenerative control for the motor generator M in the second mode is defined as a zero value on the time axis. In the embodiment illustrated in FIG. 5, the drive source 5 is rotating at constant speed, and a rotor of the motor generator M is rotating at a constant speed. That is, the motor generator M is rotating at a constant speed in the embodiment illustrated in FIG. 5.

The controller 34 sets the regenerative torque of the motor generator M to zero at the timing of starting the regenerative control for the motor generator M. The regenerative current is proportional to the regenerative torque. For this reason, the motor generator M initially rotates with no load. Regenerative power is not generated from the motor generator M at this timing, and the value of regenerative current is also zero. The controller 34 thus sets the regenerative torque of the motor generator M to zero at the timing of starting the second mode.

Figure 5:
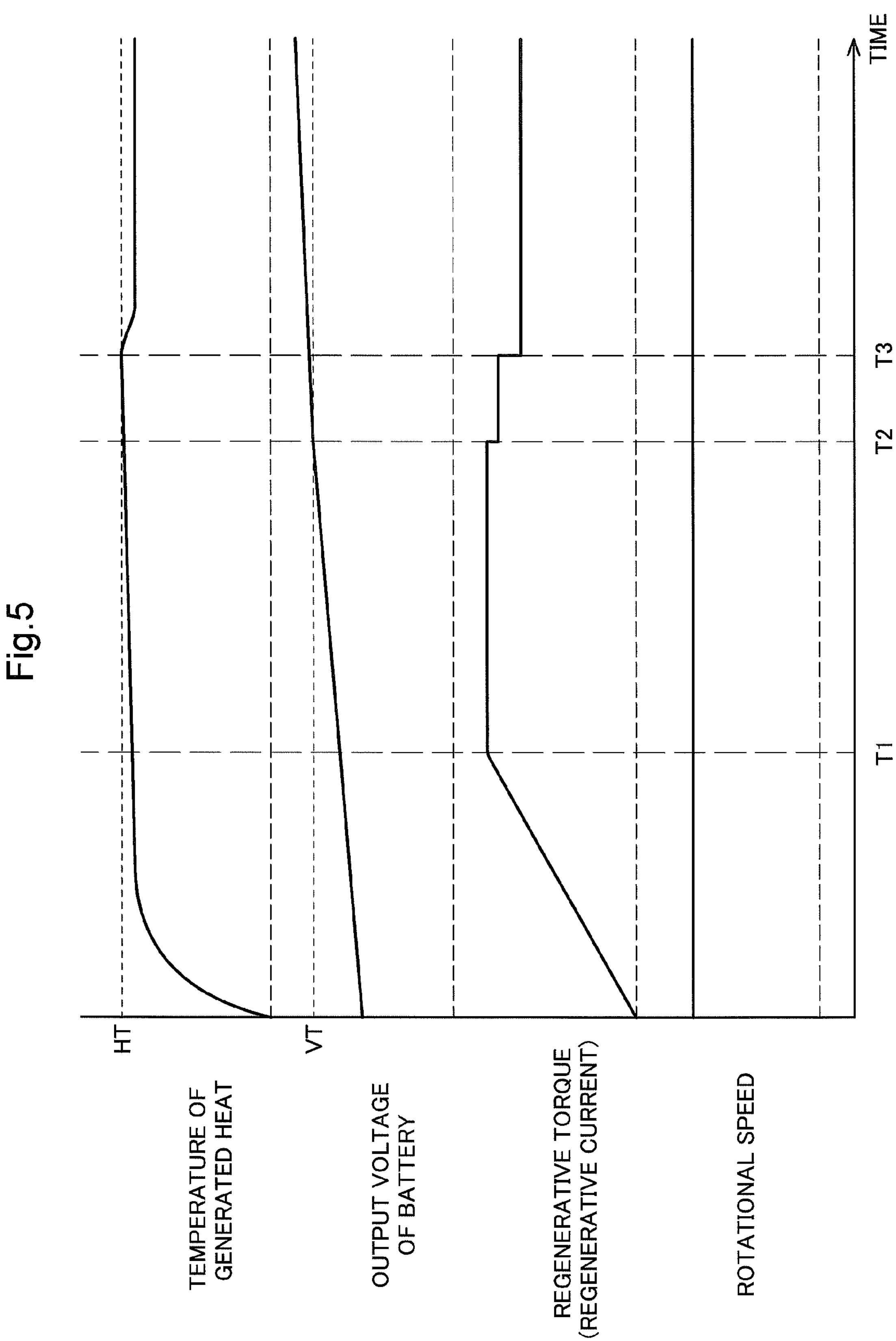
FIG. 5 is a graph showing the temperature of heat generated by a battery, the battery voltage, the regenerative torque of a motor generator, and the rotational speed of the motor generator, while the motor generator generates power.

The regenerative torque of the motor generator M gradually increases during a period from the zero value to a timing T1 on the time axis in FIG. 5. That is, the controller 34 makes the regenerative torque of the motor generator M larger as time passes from the point in time at which the second mode starts until the point in time at which the preset timing T1 passes. At this time, the rotational speed of the drive source 5 is likely to decrease due to the regenerative load of the motor generator M. For this reason, the drive source is subjected to constant-speed control in such a manner that the rotational speed of the drive source 5 is kept constant. The configuration in which the controller 34 thus gradually applies the regenerative load to the motor generator M makes the drive source 5 more unlikely to stall, and makes the rotational speed of the drive source 5 more easily kept constant.

The regenerative power generated by the rotation of the motor generator M is alternating-current electric power and is input to the converter 14. The converter 14 converts the alternating-current electric power generated by the rotation of the motor generator M to direct-current electric power, and supplies the direct-current electric power to the battery 4. The voltage detector 37 detects the output voltage of the battery 4.

The controller 34 of this embodiment controls the regenerative torque in such a manner that the output voltage of the battery 4 is kept at a rated voltage or less, for example. The output voltage of the battery 4 exceeds a voltage threshold VT at a timing T2 in FIG. 5. The voltage threshold Vt is lower than the rated voltage of the battery 4. Accordingly, the controller 34 reduces the regenerative torque of the motor generator M at the timing T2. Thus, in the second mode, in response to the output voltage of the battery 4 exceeding the preset voltage threshold VT, the controller 34 controls the motor generator M in such a manner that the regenerative power is smaller than the regenerative power exhibited at the point in time at which the output voltage of the battery 4 reached the voltage threshold VT. The voltage threshold VT corresponds to a “first threshold” recited in the claims.

The battery 4 generates heat from internal unit batteries (cells) while being charged. The temperature detector 36 detects the temperature of generated heat. The controller 34 of this embodiment controls the regenerative torque in such a manner that the temperature of heat generated by the battery 4 is kept at a temperature threshold HT or less. The temperature of heat generated by the battery 4 exceeds the temperature threshold HT at a timing T3 in FIG. 5. Accordingly, the controller 34 reduces the regenerative torque of the motor generator M at the timing T3. Thus, in the second mode, in response to the temperature of heat generated by the battery 4 exceeds the preset temperature threshold HT, the controller 34 controls the motor generator M in such a manner that the regenerative power is smaller than the regenerative power exhibited at the point in time at which the temperature of generated heat reached the temperature threshold HT. The temperature threshold HT corresponds to a “second threshold” recited in the claims.

Although not shown in FIG. 5, if the temperature of heat generated by the battery 4 exceeds the temperature threshold HT, the controller 34 may set the regenerative torque of the motor generator M to zero and wait for the battery 4 to be cooled. The controller 34 may then gradually increase the regenerative torque of the motor generator M again after the temperature of heat generated by the battery 4 decreases to a certain temperature or lower.

Although not shown in FIG. 5, the controller 34 may finely adjust the regenerative torque of the motor generator M in such a manner that the temperature of heat generated by the battery 4 is within a preset range lower than or up to the temperature threshold HT. Also, the controller 34 may finely adjust the regenerative torque of the motor generator M in such a manner that the output voltage of the battery 4 is within a range lower than or up to the rated voltage.

The controller 34 is capable of performing regenerative control for the motor generator M until the battery 4 is fully charged while monitoring the output voltage of the battery 4 and the temperature of heat generated by the battery 4. Note that the charging state of the battery 4 (the remaining power value, time required to fully charge the battery 4, etc.) may be displayed in a meter panel (not shown) provided in the operator section 3, or may be displayed on a smartphone or a tablet computer through wireless communication (including wireless internet communication), for example.

Other Embodiments

The present invention is not limited to the configuration illustrated in the above embodiment. Other representative embodiments of the invention will be described below.

(1) The motor generator M of the above embodiment drives both the traveling device (the left and right front wheels 10 and the left and right rear wheels 11) and the work device (the mowing device 19) to rotate, but the motor generator M is not limited to this embodiment. The motor generator M may alternatively drive either the traveling device or the work device.

(2) The above embodiment takes a lithium ion battery as an example of the battery 4, but the battery 4 is not limited to this embodiment. For example, the battery 4 may alternatively be a solid-state battery.

(3) The output shaft 5A of the drive source 5 of the above embodiment is connected to the rear PTO shaft 18, but the output shaft 5A may alternatively be connected to the mid PTO shaft 17. In this case, the motor generator M is rotated by the motive power of the drive source 5 and capable of generating electric power while the output shaft 5A of the drive source 5 is connected to the mid PTO shaft 17 and the first clutch **17*a* is in the on-state. Further, the output shaft 5A of the drive source 5 may alternatively be connected to the front PTO shaft 20. In this case, the motor generator M is rotated by the motive power of the drive source 5 and capable of generating electric power while the output shaft 5A of the drive source 5 is connected to the front PTO shaft 20 and the third clutch 20*a* is in the on-state. That is, the “power output shaft” recited in the claims may alternatively be the mid PTO shaft 17 or the front PTO shaft 20**.

(4) The controller 34 of the above embodiment described with reference to FIG. 5 sets the regenerative torque to zero at the timing of starting the second mode, but the controller 34 is not limited to this embodiment. The controller 34 may set the regenerative torque to a value larger than zero at the timing of starting the second mode.

(5) The “power output shaft” of the above embodiment is a PTO shaft connectable to the input shaft of the work device, but the power output shaft may alternatively be, for example, a traveling drive shaft. For example, a configuration may be adopted in which the traveling device is driven and the driving force of the traveling device is transferred to the motor generator M via the power output shaft in response to the electric work vehicle being pulled by another vehicle. This configuration can also cause the motor generator M to generate regenerative power.

(6) The above embodiment takes the mowing device 19 as an example of the work device. The work device is not limited to this embodiment. For example, the work device may alternatively be a cultivator, a seeding machine, a planter, a fertilizer applicator, a leaf cutter, a sprayer, a baler, a mulcher, a stone picker, a rotary rake, a tedder, a traction-type harvest sorter, a thinning machine, a power tiller, or a ridging machine.

(7) The above embodiment takes the electric tractor as an example of the electric work vehicle, but the electric work vehicle is not limited to this embodiment. For example, the electric work vehicle may be an electric rice transplanter, an electric distributor, an electric sprayer, an electric combine, an electric mower, an electric power tiller, an electric wheel loader, or an electric backhoe.

Note that the configuration disclosed in the above embodiment (including other embodiments; the same applies to the following) can be combined with configurations disclosed in other embodiments as long as no contradiction arises. The embodiment disclosed herein is an example, and embodiments of the present invention are not limited thereto. The invention can be modified as appropriate without departing from the objects of the present invention.

The present invention is applicable to not only electric tractors but also combines, rice transplanters, and various other electric work vehicles such as construction work machines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle comprising:

a battery configured to store electric power;

a motor generator conductively connected to the battery;

a power transfer device having a power output shaft configured to transfer motive power from the motor generator;

a controller configured to switch between (i) a first mode, in which the controller drives the motor generator with use of the electric power stored in the battery, and (ii) a second mode, in which the controller causes the motor generator to generate regenerative power while the motor generator rotates due to receiving motive power from a drive source connected to the power output shaft, and charge the battery with the regenerative power; and the controller making regenerative torque of the motor generator gradually larger as time passes from a point in time at which the second mode starts until a point in time at which a preset time passes.

2. The electric work vehicle according to claim 1, wherein the controller sets the regenerative torque to zero at a timing of starting the second mode.

3. The electric work vehicle according to claim 1, further comprising:

a voltage detector configured to detect an output voltage of the battery, wherein in the second mode, in response to the output voltage of the battery exceeding a preset first threshold, the controller controls the motor generator in such a manner that the regenerative power is smaller than the regenerative power exhibited at a point in time at which the output voltage of the battery reached the first threshold.

4. An electric work vehicle comprising:

a battery configured to store electric power;

a motor generator conductively connected to the battery;

a power transfer device having a power output shaft configured to transfer motive power from the motor generator;

a controller configured to switch between (i) a first mode, in which the controller drives the motor generator with use of the electric power stored in the battery, and (ii) a second mode, in which the controller causes the motor generator to generate regenerative power while the motor generator rotates due to receiving motive power from a drive source connected to the power output shaft, and charge the battery with the regenerative power; and a temperature detector configured to detect a temperature of heat generated by the battery, wherein in the second mode, in response to the temperature of heat generated exceeding a preset second threshold, the controller controls the motor generator in such a manner that the regenerative power is a smaller non-zero value than the regenerative power exhibited at a point in time at which the temperature of heat generated reached the second threshold.

5. The electric work vehicle according to claim 1, wherein the power output shaft is a PTO shaft connectable to an input shaft of a work device.

6. A charging method for charging a battery mounted in an electric work vehicle, the method comprising:

connecting a drive source to a power output shaft of a power transfer device configured to transfer motive power from a motor generator conductively connected to the battery;

rotating, with use of the drive source, the motor generator via the power transfer device to cause the motor generator to generate regenerative power;

charging the battery with the regenerative power; and gradually increasing regenerative torque of the motor generator as time passes from a point in time at which the charging starts until a point in time at which a preset time passes.

7. The electric work vehicle according to claim 1, wherein the controller keeps the regenerative torque of the motor generator at a torque value set at the point in time at which the preset time passes after the preset time has elapsed.

* * * * *